(12) United States Patent
Arthur

(10) Patent No.: US 8,341,780 B2
(45) Date of Patent: Jan. 1, 2013

(54) STABILIZED ORNAMENTAL PILLOW

(76) Inventor: Laury Arthur, Carlsbad, CA (US)

( * ) Notice: Subject to any disclaimer, the term of this patent is extended or adjusted under 35 U.S.C. 154(b) by 0 days.

(21) Appl. No.: 11/928,105

(22) Filed: Oct. 30, 2007

(65) Prior Publication Data

US 2009/0151075 A1 Jun. 18, 2009

Related U.S. Application Data

(60) Provisional application No. 60/855,150, filed on Oct. 30, 2006.

(51) Int. Cl.
*A47C 20/00* (2006.01)
(52) U.S. Cl. ................................. 5/633; 5/630
(58) Field of Classification Search .............. 5/630, 646, 5/633, 652, 636
See application file for complete search history.

(56) References Cited

U.S. PATENT DOCUMENTS 4,858,995 A * 8/1989 Young ...................... 297/411.23

\* cited by examiner

*Primary Examiner* — Fredrick Conley

(57) ABSTRACT

A decorative object, most conveniently embodied as a decorative pillow, is constructed to maintain a substantially fixed spatial relationship to a supporting substrate within a vehicle interior while not requiring the use of fastening means. The supporting substrate may comprise a vehicle seat. A decorative pillow is provided with a surface or surfaces providing ornamentation. Components in the interior of the pillow interact to function efficiently as a fill chamber and a ballast chamber. The ballast chamber may be positioned to avoid engagement with surfaces exposed to a user. Ballast provides for inertia so that the pillow will tend to stay in place when acceleration forces are applied thereto.

11 Claims, 3 Drawing Sheets

STABILIZED ORNAMENTAL PILLOW

RELATED APPLICATION(S)

This application claims the benefit of U.S. Provisional Patent Application No. 60/855,150, filed Oct. 30, 2006, entitled: "Stabilized Ornamental Pillow" which is hereby incorporated by reference in its entirety.

FIELD OF THE INVENTION

The present subject matter relates to an ornamental pillow that interacts with its environment to maintain a selected spatial relationship even when subjected to outside forces.

BACKGROUND OF THE INVENTION

Ornamental pillows have found significant application in many decorating environments. These environments generally comprise rooms in a residence or office. These environments are stationary. However, formal decorating has also been provided in mobile environments. For example, the Lincoln Town Car, beginning in the 1980's, had models decorated by such designers as Bill Blass. In 2003, the Lincoln Town Car had a Cartier model. Lincoln division of Ford Motor Company has more recently introduced a series of cars with the name Designer Series. Other manufacturers have introduced designer option packages. The art of interior design has been expanded from within the home to the interior of vehicles such as automobiles.

Interior design commonly utilizes a number of accessories such as, for example, accent pillows. When used in stationary environments, accessories will stay where they are put. However, in mobile environments, accessories such as pillows may move from a position in which they are originally placed. In a car, a pillow may move when a car goes around the turn or hits a bump. In a smaller boat, e.g., 25 feet, a pillow may fall on to a floor from where it was placed, in response to choppy water conditions or when the boat is making a sharp turn. A fallen pillow may present a safety hazard when an unsuspecting passenger steps on it. The decorator pillow may also become filthy when dropped on a floor. Many materials are hard to clean. Decorator pillows specifically designed for use in mobile environments have not been provided. Weighted pillows exist. However, they have been provided for other purposes and are not suited to decorating in a mobile environment.

U.S. Pat. No. 3,951,453 discloses a seating device including a base portion and at least one top cushion movably positioned on the base portion. An insert of relatively heavier material than that of the cushion is placed in the lower portion of the cushion to maintain the latter in a selected position on the base while the seating device is in use. The top cushion may be an arm cushion, a back cushion or a head cushion. The insert in the lower portion of the top cushion may be of a loose, pourable granulate material such as sand. Additionally the top cushion may be held in a selected position by affixing a Velcro® fastener to the underside of the top cushion. The cushion must be part of an integrated chair or sofa. The cushion cannot have an independent or arbitrary shape or other design element. In embodiments in which Velcro is used, a fastener must be placed on a substrate surface as well as on the cushion. In many applications, a user wants to have the option of removing the cushion and not leave a fastener visible on the substrate. In these applications, the substrate must not have a fastener attached thereto.

U.S. Pat. No. 3,226,737 discloses a beach blanket having weighted corners. However, this comprises a substantially two-dimensional object that does not have an ornamental relationship with respect to a substrate surface.

U.S. Pat. No. 5,363,526 discloses a post-operative pillow including a weight and means to removably secure the weight to the pillow. The function of the weight is to assist in the application of pressure to a localized area of the patient's body. A pocket formed on an outer portion of the pillow receives a removably secured weight which is frictionally retained within the pocket. The pillow does not have a significant position to be maintained in the absence of a user. The weight is selected to be applied to a user. The weight is not related to positioning of the pillow.

U.S. Pat. No. 6,684,429 discloses an inflatable beach pillow provided with a water compartment that can be filled to anchor the pillow in place, and also has a sand pocket that can alternatively be filled with sand to serve as a weighting material. The sand pocket can slip over the back of a chair to allow the inflatable pillow to serve as a headrest. This pillow includes separate sections for weight and for cushioning. It does not serve as an ornamental pillow.

United States Patent Published Application 20020152553 discloses a support travel cushion that attaches to a bucket seat back of an automobile or other vehicle which primarily supports the users upper back or neck during travel. An attached strap is used to secure the cushion to the bucket seat. A pillow is provided in a car, but it is not decorative, and it must be secured to a seat.

These prior embodiments do not disclose a pillow that can be provided having a shape that is independent of its supporting substrate and which is adapted for maintaining a substantially fixed spatial relationship to the supporting substrate while not requiring the use of fastening means.

SUMMARY OF THE INVENTION

Briefly stated, in accordance with embodiments of the present invention a decorative object, most conveniently embodied as a decorative pillow, is constructed to maintain a substantially fixed spatial relationship to a supporting substrate while not requiring the use of fastening means. The supporting substrate may comprise a vehicle seat. The term "vehicle" can, as non-limiting examples, refer to planes, trains, automobiles, boats, and light jet air/land craft. A decorative pillow is provided with a surface or surfaces providing ornamentation. Components in the interior of the pillow interact to function efficiently as a fill chamber and a ballast chamber. The ballast chamber may be positioned to avoid engagement with surfaces exposed to a user. Ballast provides for inertia so that the pillow will tend to stay in place when acceleration forces are applied thereto.

DETAILED DESCRIPTION

Figure 1:
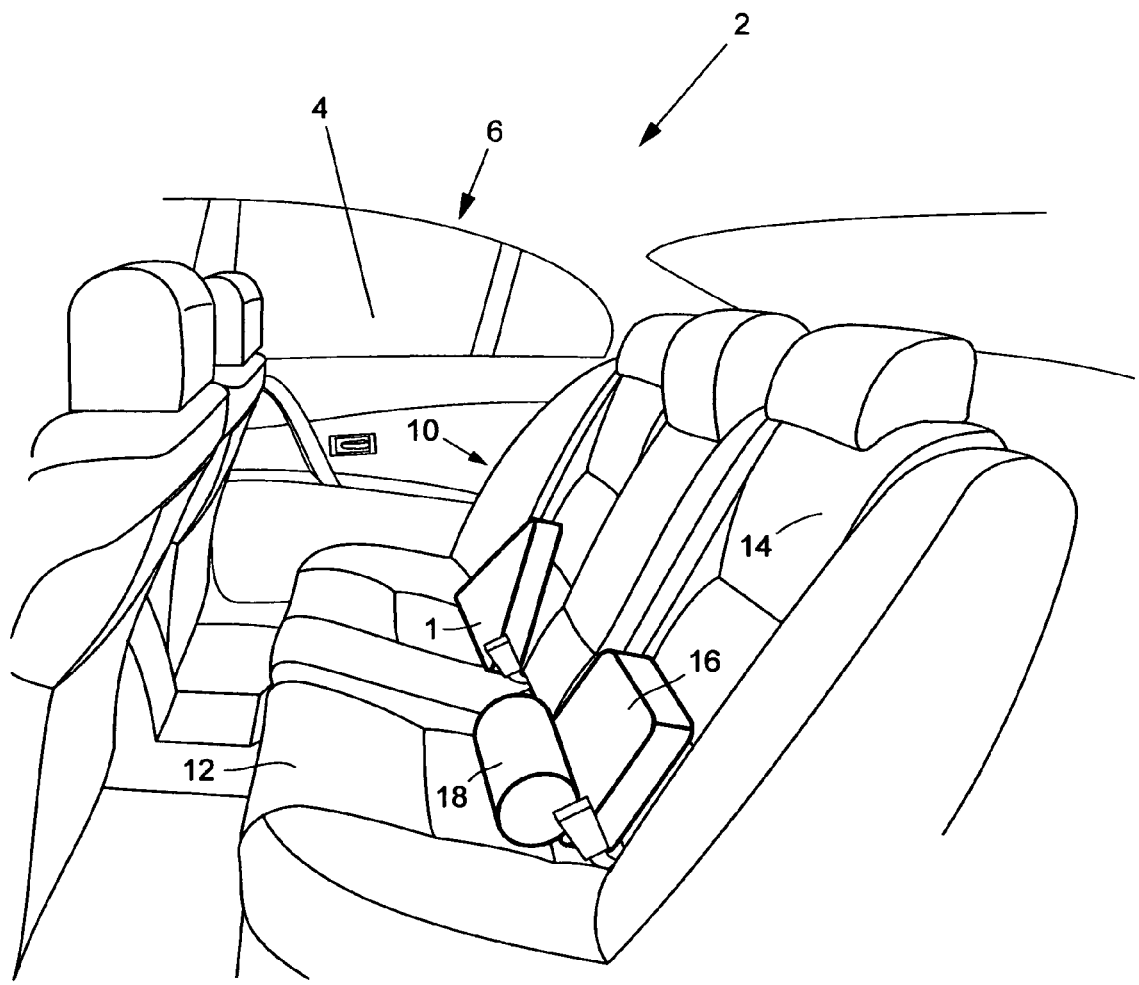
FIG. 1 is an illustration of a pillow in an operational environment.

Referring now to FIG. 1, a pillow 1 constructed in accordance with an embodiment of the present invention is illustrated in an environment 2. In the present illustration, the operational environment 2 is an interior 4 of a sedan 6. The pillow 1 rests on a backseat 10. The backseat 10 comprises a bench 12 and a back 14. A user may choose a position of the pillow 1 in which the pillow 1 is primarily in engagement with the bench 12 or engaging both the bench 12 and the back 14. The user may employ the pillow 1 in an application in which it provides ornamentation. The pillow 1 may be removed when the backseat 10 is to be fully occupied. Alternatively, a passenger in the backseat 10 could use the pillow 1 for support. However, ornamental pillows are not generally used or intended for support.

While the pillow 1 may be utilized for ornamentation, further functionality may be provided. For example, a user may also use the pillow 1 for lumbar or other support. The pillow 1 may be constructed with any of a number of types of fill. Certain fills, as further discussed below, provide for low-cost, durability and shape maintenance. Other fills may be provided which have various properties facilitating orthopedic or other benefits.

The pillow 1 in the present illustration comprises a triangular solid. The pillow 1 could have another geometric shape, e.g. a square; a cube; a sphere; an hourglass; a U-shape; of a half-moon. Pillows 1 could also be provided with shapes to simulate selected objects. Additionally or alternatively, another pillow or other pillows, for example a second pillow 16 and a third pillow 18, could be provided. The second pillow 16 comprises a rectangular parallelepiped including one substantially planar surface comprising a square. The third pillow 18, commonly referred to as a bolster, is a right circular cylinder.

Figure 2:
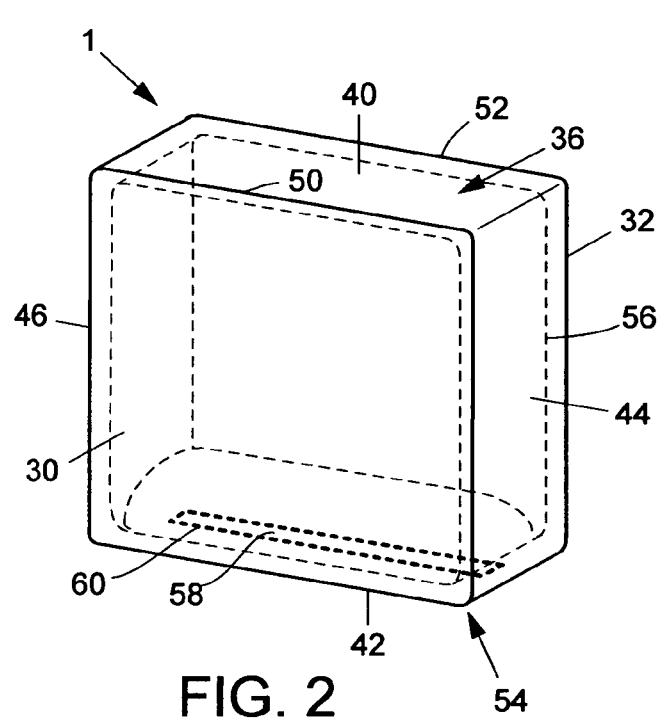
FIG. 2 is a axonometric view of a pillow.
Figure 3:
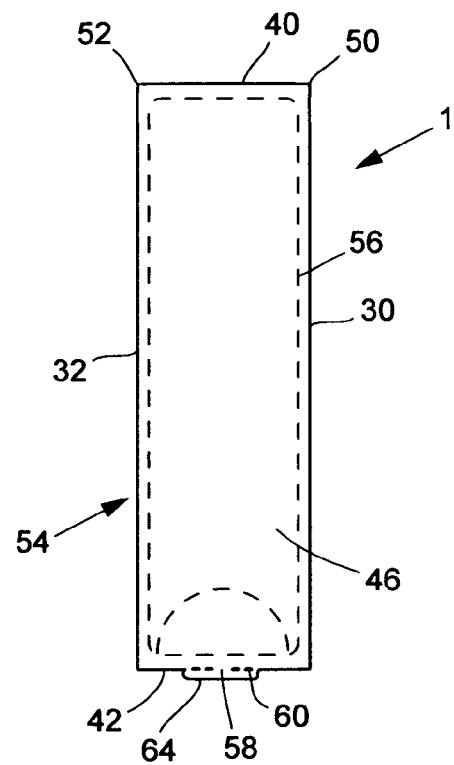
FIG. 3 is side elevation of a pillow.

For stability, it is desirable to provide a low center of gravity in each pillow 1. It is also desirable to provide a pillow that has the feel and appearance of a conventional ornamental pillow rather than having a readily discernible weighted portion. In embodiments of the present invention, weighted sections are provided in a manner to meet these requirements. FIGS. 2 and 3 are respectively an axonometric view and a side elevation of a pillow 1. In this illustration, the pillow 1 has a square cross section in its largest dimension. Dotted lines are used to denote locations of components within the pillow 1 which are further described below.

In its simplest form, the pillow 1 may comprise a front panel 30 and a rear panel 32. Terms referring to location are arbitrary, and used to define relative positions within the pillow 1 itself rather than spatial orientation with respect to other objects. Additionally, a peripheral wall 36 extending in a longitudinal direction may be provided between the front and rear panel 30 and 32. A longitudinal dimension at a particular point on the periphery of the peripheral wall 36 defines thickness of the pillow 1. In the case of a square pillow 1, the peripheral wall 36 comprises upper and lower walls 40 and 42 as well as right and left walls 44 and 46. The walls 40, 42, 44 and 46 may comprise a unitary piece or separate pieces. A seam 50 joins the front panel 30 and the peripheral wall 36. A seam 52 joins the rear panel 32 to the peripheral wall 36. The seams 50 and 52 may be sewn. Alternatively, they may be formed by an adhesive or by a mechanical fastener.

In one preferred form, the pillow 1 comprises an outer cover 54 and a fabric insert 56. It is preferable to provide a fabric insert 56 which is modular with respect to the outer cover 54, but not necessary. Use of a separate outer cover 54 provides for flexibility in inventory where it may be desirable to provide for selections of different forms of outer cover 54 design or for combination with fabric inserts 56 having different types of fill. Ease of assembly is facilitated. Also, fabric inserts 56 are often made of thinner material which is easier to work with than the outer covers 54.

The fabric insert 56 may be insertable into the outer cover 54 through a slot 58 closed by a zipper 60. The slot 58 may be included in the lower wall 42 and extend along a transverse dimension thereof. The lower wall 42 comprises a flap 64 to cover the zipper 60. In many applications, it is desirable to provide an outer cover 54 having a close fit with the fabric insert 56. However, some designs may include a portion or portions in which corresponding areas of the outer cover 54 have greater dimensions than the corresponding areas of the fabric insert 56, giving a draped appearance.

The outer cover 54 may comprise any of a number of materials that may be selected for ability to bear graphic designs, contrast or harmonize with the texture of the backseat 10 (FIG. 1) or be pleasant to touch. Fringes or other attachments, trims or extensions may be attached to or incorporated in the outer cover 54.

Figure 4:
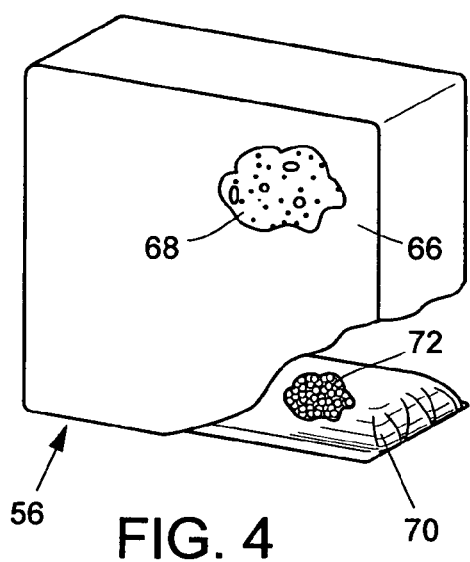
FIG. 4 is an axonometric view of a fabric insert, partially broken away, removed from an outer cover.
Figure 5:
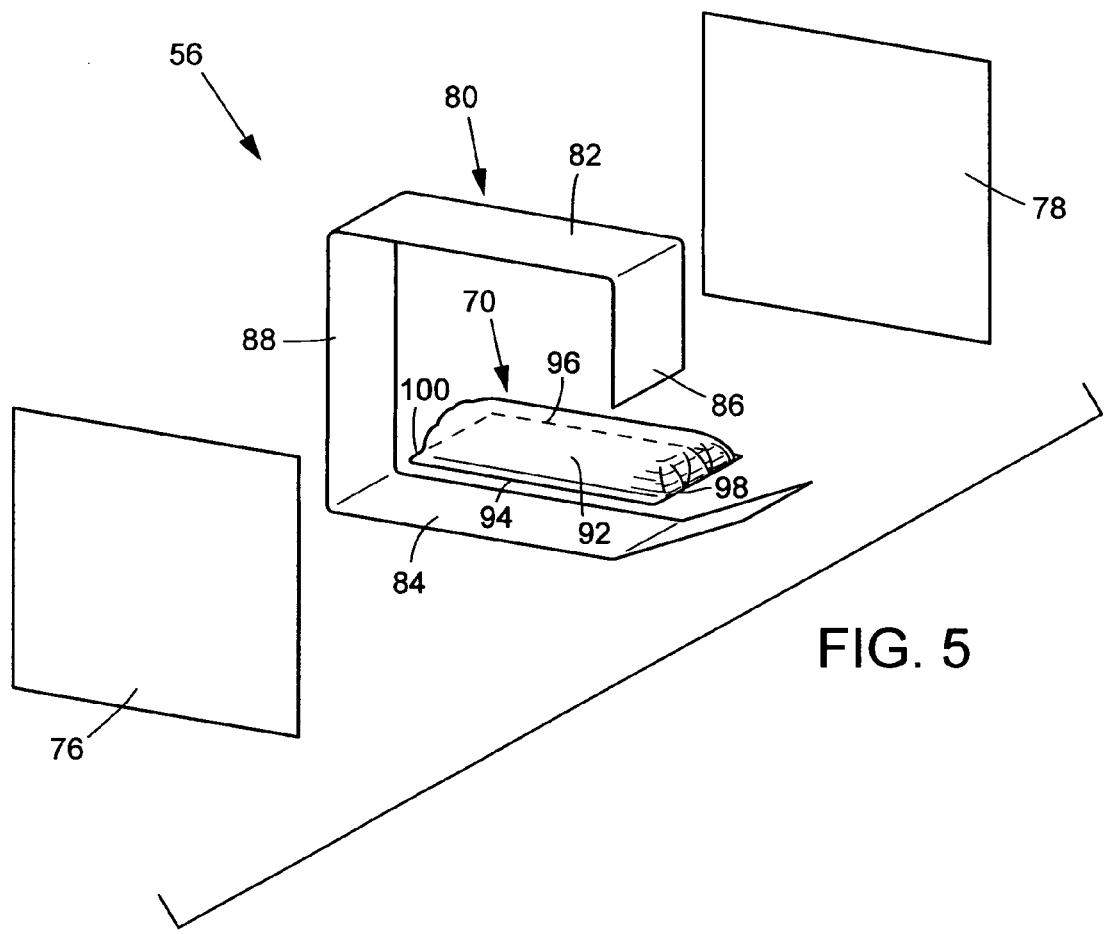
FIG. 5 is an exploded illustration of one form of the fabric insert comprising a fill chamber and a ballast chamber.
Figure 6:
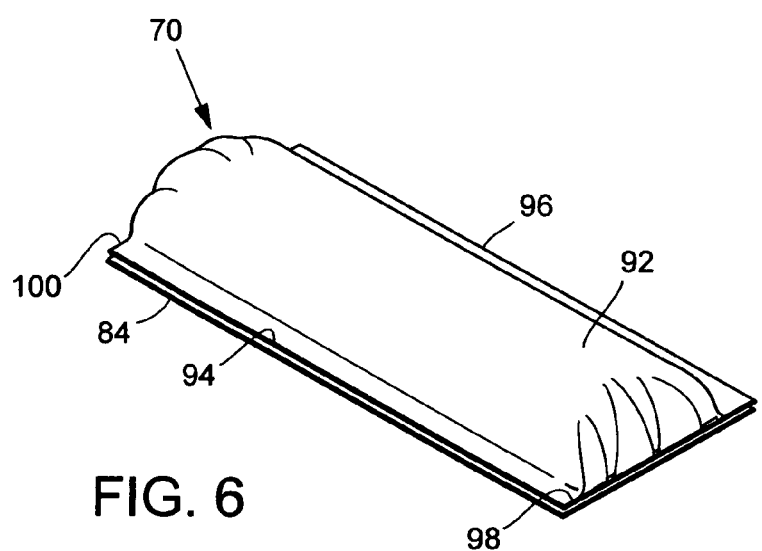
FIG. 6 is a partial detailed axonometric view of FIG. 4 illustrating the ballast chamber.

FIG. 4 is an axonometric view of the fabric insert 56, partially broken away, removed from the outer cover 54 (FIG. 3). The fabric insert 56 comprises a fill chamber 66 containing fill 68 and a ballast chamber 70 containing ballast 72. FIG. 5 is an exploded illustration of one form of the fabric insert 56. FIG. 6 is a partial detailed axonometric view of FIG. 4 illustrating the ballast chamber 70. The fabric insert 56 may be provided with many different sorts of fill 68 in order to meet design objectives. A suitable fill 68 should have good hygienic properties and be capable of holding a shape. Where the objective is simply to fill the fabric insert 56, a cost-effective alternative is polyester fiberfill. In order to simulate the feel of a down pillow while avoiding the use of organic, potentially allergenic material, a suitable material for use is polyester fiberfill with silicone added. An example of this material is sold under the trademark Poly-Down®. Alternatively, the fabric insert 56 may be filled with rubber foam of a type used in orthopedic medical devices, or a material such as buckwheat husk.

Ballast 72 may take any of a number of forms. Ball bearings will provide dense ballast, providing for a particularly low center of gravity. However, this form of list would be expensive and may lead to premature wear on components of the pillow 1. A suitable form of low-cost ballast is gravel. Gravel is heavy, relatively low cost and easily washed to provide for clean ballast 72. Gravel is not subject to oxidation or breakage. A traditional form of ballast is beans, such as in beanbag chairs. Actual beans are undesirable in that they are organic and subject to deterioration. Plastic substitutes may lack density and durability.

The fabric insert 56 comprising the fill chamber 66 may be constructed of a selected number of surfaces. Commonly, pieces are sewn together, leaving an opening through which to insert filling. The fabric insert 56 is then turned inside out, filled and then the opening is sewn. The ballast chamber 70 may comprise one wall in addition to the walls of the fabric insert 56. Alternatively, the ballast chamber 70 may comprise a separate chamber preferably fixed to the walls of the fabric insert 56.

As seen in FIG. 5, the present embodiment comprises a plurality of pieces. A front panel 76 and a rear panel 78 are provided for fastening to a peripheral wall 80. The peripheral wall 80 includes upper and lower portions 82 and 84 for positioning in registration with the upper and lower walls 40 and 42 of the outer cover 54 (FIG. 2) and right and left portions 86 and 88 for positioning in registration with the right and left walls 44 and 46 out of the outer cover 54. The ballast chamber 70 in the present illustration is formed by a ballast panel 92 joined to the lower portion 84. The ballast panel 92 may comprise a rectangular piece having a transverse dimension substantially equal to that of the lower portion 84 and a longer longitudinal dimension. The ballast panel 92 is joined to the lower portion 84 at each of transversely extending edges 94 and 96. Shorter, longitudinally extending edges of the lower portion 84 are joined right and left longitudinally extending edges 98 and 100 of the ballast panel 92. The edges 98 and 100 are gathered so that the entire depth of each edge 98 and 100 is fixed to and confined within the longitudinal depth of the lower portion 84. The ballast chamber 70 is defined by the space between the ballast panel 92 and the lower portion 84. This construction provides a tent-like shape for the ballast panel 92.

This construction provides for a ballast chamber 70 having any right angular cross-section in the horizontal, longitudinal direction and a substantially argue at cross-section in the vertical, transverse direction. Therefore, surfaces of the ballast chamber 70 need not bear against front or rear panels 30 and 32 or the right and left walls 44 and 46 of the outer cover 54 (FIG. 2). Fill may therefore occupy space between these surfaces and the ballast chamber 70. A user need not to have to feel ballast when in contact with the pillow 1.

The present subject matter being thus described, it will be apparent that the same may be modified or varied in many ways.

What is claimed is:

1. A pillow for a vehicle seat having a backrest comprising: a case having a front panel, rear panel, a peripheral wall between said front panel and said rear panel and a base and a fabric insert able to be received by said case, said fabric insert comprising a fill chamber containing fill and a ballast chamber containing ballast, said ballast chamber being positioned within said fill chamber along one edge, said fill chamber fitted within said case so that said ballast chamber is positioned at said base of said pillow so that said ballast maintains said pillow substantially fixed against said backrest during normal operation of said vehicle.

2. The pillow according to claim 1, wherein said vehicle is an automobile, a train, a boat or an aircraft.

3. The pillow according to claim 1, wherein said fill is hygienic.

4. The pillow according to claim 1, wherein said fill is a synthetic fill.

5. The pillow according to claim 4, wherein said fill is polyester, Poly-Down® or rubber foam.

6. The pillow according to claim 1, wherein said fill is a natural fiber fill.

7. The pillow according to claim 6, wherein said fill is buckwheat.

8. The pillow according to claim 1, wherein said fill chamber contains a single ballast chamber.

9. The pillow according to claim 1, wherein said ballast is selected from the group consisting of ball bearings, gravel, beans and plastic beads.

10. The pillow according to claim 1, wherein said ballast chamber is a separate chamber affixed within the fabric insert.

11. The pillow according to claim 1, further comprising a mechanical fastener along a portion of the peripheral wall.

* * * * *